United States Patent [19]
Kawai et al.

[11] Patent Number: 5,741,044
[45] Date of Patent: Apr. 21, 1998

[54] PILLAR GARNISH SUPPORT STRUCTURE FOR AUTOMOBILE

[75] Inventors: Akira Kawai, Minami-ashigara; Tetsuo Maki, Yokosuka; Shozo Suzuki, Iruma, all of Japan

[73] Assignee: Nissan Motor Co., Ltd., Yokohama, Japan

[21] Appl. No.: 606,799

[22] Filed: Feb. 26, 1996

[30] Foreign Application Priority Data

Feb. 28, 1995 [JP] Japan ................... 7-040287

[51] Int. Cl.$^6$ ........................... B62D 25/04
[52] U.S. Cl. .................. 296/203; 296/39.1; 296/189
[58] Field of Search ..................... 296/203, 194, 296/39.1, 189; 280/751

[56] References Cited

U.S. PATENT DOCUMENTS 5,575,500  11/1996  Mimura et al. ............... 296/189 X

FOREIGN PATENT DOCUMENTS 4-42450  4/1992  Japan .

Primary Examiner—Joseph D. Pape
Attorney, Agent, or Firm—Foley & Lardner

[57]  ABSTRACT

A bracket is provided with a projection having its tip displaced from a rear panel of a pillar inner panel toward the rear end of the automobile and the projection is provided with a through bore and that the garnish main body has its inner surface held in linear contact with the tip of the projection of the bracket and includes a boss inserted into the through bore of the projection of the bracket and supported by the projection.

7 Claims, 1 Drawing Sheet

PILLAR GARNISH SUPPORT STRUCTURE FOR AUTOMOBILE

BACKGROUND OF THE INVENTION

1. Field of Invention

This invention relates to a pillar garnish support structure for an automobile.

2. Prior Art

A known pillar garnish support structure for an automobile as disclosed in Japanese Utility Model Application Laid-Open No. 4-42450 comprises a front pillar inner panel having a substantially U-shaped cross section and including a front panel disposed vis-a-vis an end of the front window panel of an automobile as a "front window panel" and a rear panel disposed vis-a-vis an end of a side window panel of the automobile as a "rear window panel" and a molded garnish main body of synthetic resin supported by the front and rear panels of the front pillar inner panel with a bracket interposed therebetween and welded to the front and rear panels in such a way that the internal surface of said front pillar inner panel is covered by the garnish main body.

A disadvantage of such a known pillar garnish support structure for an automobile as described above is that, the cross sectional profile of said bracket is designed simply to support the garnish main body and, therefore, it can easily be bent when it is pushed as a person gets into the automobile.

Another disadvantage is that since the bracket is held in engagement with a rib projecting from the inner surface of said garnish main body, "sink" marks that adversely affect the surface quality of the garnish main body can be produced if the rib projecting from the inner surface of said garnish main body has a large size.

Still another disadvantage is that with the known structure is that, the use of a separate clip is necessary to securely support the bracket and the garnish main body, this raises the cost of manufacturing the garnish.

Yet another disadvantages with the known structure is that, the garnish main body can be thermally deformed to make the bracket unintentionally become released when the automobile is used in a geographical region where the internal temperature of the automobile can rise very high.

SUMMARY OF THE INVENTION

In view of the above identified problems, it is therefore the object of the present invention to provide a pillar garnish support structure for an automobile that provides a secure feeling, is free from "sink" marks that can adversely affect the surface quality, and is less costly and can maintain the holding effect of the bracket if used at high temperature.

According to a first aspect of the present invention, there is provided a pillar garnish support structure for an automobile comprising an pillar inner panel having a substantially U-shaped cross section and including an front panel disposed vis-a-vis an end of the front window panel of the automobile and a rear panel disposed vis-a-vis an end of the rear window panel of the automobile and a garnish main body supported by the front and rear panels of the pillar inner panel by way of a bracket interposed therebetween in such a way that the internal surface of the pillar inner panel is covered by the garnish main body, characterized in that the bracket is provided with a projection having its tip displaced from the rear panel of the pillar inner panel toward the rear end of the automobile and the projection is provided with a through bore and that the garnish main body has its inner surface held in linear contact with the tip of the projection of the bracket and includes a boss inserted into the through bore of the projection of the bracket and supported by the projection.

In a pillar garnish support structure for an automobile as described above, preferably at least one of the ends of the garnish main body is clamped between an anchor member of the bracket and a lip of a welt held in engagement with a flange of the pillar inner panel.

In a pillar garnish support structure for an automobile as described above, preferably a rib having a recess is formed on the inside of the other end of the garnish main body and held in engagement with the anchor member of the bracket.

In a pillar garnish support structure for an automobile as described above, preferably the anchor member of the bracket is formed as a raised member standing up from at least either one of the front panel and the rear panel.

With a pillar garnish support structure for an automobile according to the present patent application, if the bracket is pushed by a person getting into the automobile, the projection is made to directly face the applied pushing force to prevent the bracket from being deformed because the tip of the projection of the bracket is displaced toward the person or the rear of the automobile from the position of the rear panel of the pillar inner panel. Thus, the structure provides a secure feeling and enhances its marketability.

Additionally, since the inner surface of the garnish main body and the projection of the bracket are held in linear contact with each other, the rib projecting from the inner surface of the garnish main body can be made small to prevent any "sink" that can adversely affect the surface quality of the garnish main body from being produced.

Finally, since the boss on the inner surface of the garnish main body is inserted into the through bore of the projection of the bracket and supported by the projection, the garnish main body can be easily arranged in position and aligned with other components.

If at least one of the ends of the garnish main body is clamped between an anchor member of the bracket and a lip of a welt held in engagement with a flange of the pillar inner panel, there is provided an additional effect of providing a secure support without the use of a separate clip and hence reduced cost because at least one of the ends of the garnish main body is clamped between an anchor member of the bracket and a lip of a welt.

If a rib having a recess is formed on the inside of the other end of said garnish main body and held in engagement with the anchor member of the bracket, there is provided an additional effect of securely maintaining the engagement of the recess of the rib and the anchor member of the bracket even if the internal temperature of the automobile rises high to make the rib apt to be separated from the anchor member of the bracket.

If the anchor member of the bracket is formed as a raised member standing up from at least either one of the front panel and the rear panel, there is provided an additional spring effect because the bracket is formed by arranging a raised member standing up from at least either one of said front panel and said rear panel.

The nature, principle and utility of the invention will become more apparent from the following detailed description when read in conjunction with the accompanying drawing.

3

DETAILED DESCRIPTION OF THE PREFERRED EMBODIMENT

Figure 1:
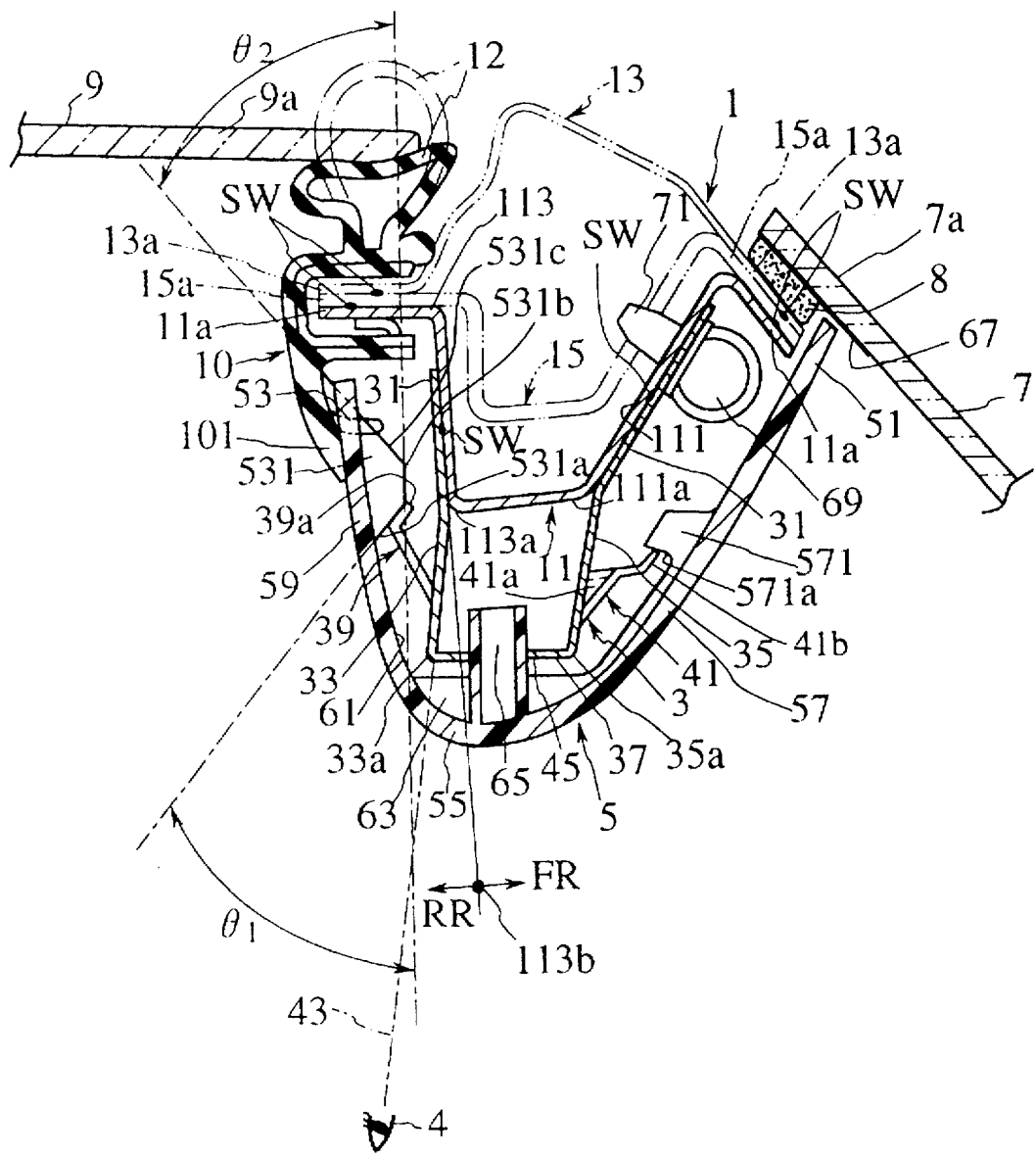
FIG. 1 is a transversal sectional view of an embodiment of pillar garnish support structure for an automobile according to the invention.

Now, the present invention will be described by referring to the accompanying drawing that illustrates an embodiment of the invention.

FIG. 1 illustrates an embodiment of pillar garnish support structure for an automobile according to the invention.

In FIG. 1, reference numeral 1 denotes a front pillar that really operates as a "pillar", reference numeral 3 denotes a bracket and reference numeral 5 denotes a garnish main body.

The front pillar 1 comprises a pillar inner panel 11 having a thickness of 1.2 millimeters, a pillar outer panel 13 having a thickness of 0.8 millimeters and a reinforcement panel 15 disposed between the panels 11 and 13 as a reinforcement and having a thickness of 2.0 millimeters to form pillar having a shell-like closed structure when the front and rear flanges 11a, 13a and 15a of the pillar panels 11 and 13 and the reinforcement panel 15 are welded together at SWs.

A front window panel 7 that operates as the above defined "front window panel" is at the inner surface of an end 7a thereof bonded to a front side flange 13a of the pillar outer panel 13 by means of an adhesive agent 8.

The front side widow panel 9 that operates as the above defined "rear window panel" is supported by a door (not shown) and an end 9a of the front side window panel 9 releasably depresses with the inner surface thereof a strip section 12 of a welt 10 supported by a rear side flange 13a of said pillar outer panel 13 to make it show a contour as illustrated by the solid lines. Note that the doubly dotted broken lines in FIG. 1 indicate the contour of the strip section 12 before it is depressed.

The pillar inner panel 11 comprises a front panel 111 arranged vis-a-vis the end 7a of the front window panel 7 and a rear panel 113 arranged vis-a-vis the end 9a of the front side window panel 9 to show a substantially U-shaped cross sectional view so that it is disposed between the window panels 7 and 9.

Each of the ends 31, 31 of the bracket 3 are respectively welded to and supported by the front panel 111 and the rear panel 113 of the pillar inner panel 11 at SWs so that the bracket 3 shows a substantially U-shaped cross sectional view or a view of three sides of a parallelogram with a first side 33 or a "rear panel", a second side 35 or a "front panel" and a third side 37 or a "projecting side". The bracket 3 additionally has a pair of anchor members 39 and 41 formed as raised members respectively standing up from said first side 33 and said second side 35.

The first side 33 is arranged on a straight line 43 connecting the eye point 4 of the front passenger seat and the interior side end 113a of the rear panel 113 of the pillar inner panel 11 of the front pillar 1 and its interior side end 33a which is an "acute apex" is located at a position displaced to the rearward RR of the automobile from the prolongation 113b of the surface of the rear panel 113.

The second side 35 is located at a position displaced to the frontward FR from the first side 33 and substantially parallel to the first side 33. The distance between the interior side end 111a of the front panel 111 of the pillar inner panel 11 of the front pillar 1 and the interior side end 35a of the second side 35 is substantially equal to the distance between the interior side end 113a of the rear panel 113 of the pillar inner panel 11 and the interior side end 33a of the first side 33.

The third side 37 or the "projecting side" is a plane connecting the interior side ends 33a and 35a of the first and second sides 33, 35 and provided with a through bore 45 with a diameter of 10 millimeters.

One of the anchor members or the anchor member 39 is cut and raised from the third side 37 to be tongue-shaped with its fixed end fixed to the first side 33 and its free end bent toward the end 31 to form a front end section 39a.

The other anchor member 41 is cut and raised from the third side 37 with its fixed end fixed to the second side 35 and reinforced by a bead 41a arranged close to the fixed end and its free end 41b bent toward the end 31 side.

The garnish main body 5 has, in its transversal cross sectional view, front and rear ends 51 and 53 respectively disposed close to the flanges 11a and 11a of the pillar inner panel 11 of the front pillar 1, a projecting section 55 that shows a minimum radius of curvature on the straight line 43 connecting the eye point 4 of the front passenger seat and the first side 33 of said bracket 3, a front side plane 57 disposed between the front end 51 and the projecting section 55 and located closest to the interior side end 35a of the second side 35 and a substantially flat rear side plane 59 disposed between the rear end 53 and the projecting section 55.

A rib 63 is provided on the inner surface 61 of the garnish main body 5 and held in linear contact with the interior side end 33a or the "acute apex" of the third side 37 of the bracket 3 and a cylindrical boss 65 with a diameter of 7.5 millimeters and a height of 5.8 millimeters is also provided on the inner surface 61 and inserted into the through bore 45 of the third side 37 of the bracket 3 and supported by the third side 37.

Another rib 531 is provided on the inner surface of the garnish main body 5 at a position close to the rear end 53 of the garnish main body 5 and clamped between the anchor member 39 of the bracket 3 and a lip 101 of the welt 10 held in engagement with the flange 11a of the pillar inner panel 11.

The rib 531 has an inclined surface 531a that is parallel to the front end section 39a of the anchor member 39, a flat section 531b having a predetermined angle θ1 of 45° relative to the oblique surface 531a and another oblique surface 531c having a predetermined angle θ2 of 45° relative to the flat section 531b.

A still another rib 571 having a recess 571a is formed on the inner surface of the front side plane 57 of the garnish main body 5 and the recess 571a of the rib 571 is engaged with the free end 41b of the anchor member 41 of the bracket 3.

Reference numeral 67 denotes a black print arranged on the inner surface of the end 7a of the front window panel 7 in order to conceal the front end 51 of the garnish main body 5 and the adhesive agent 8 so that they may not be seen from outside.

Reference numeral 69 denotes a harness to be used for electric connection of the sun roof drive motor or the audio equipment arranged in a rear portion of the automobile, the harness 69 being secured to the pillar inner panel 11 of the front pillar 1 by means of a clip 71.

Thus, with the above described embodiment, if the bracket 3 is pushed by a person getting into the automobile, the third side 37 is held vis-a-vis the pushing force to prevent bracket 3 from being deformed because the interior side end 33a of the "acute apex" of the third side 37 or the "projecting side" of the bracket 3 is located at a position displaced to the rearward RR of the automobile from the prolongation 113b of the surface of the rear panel 113. Thus, the structure provides a secure feeling to the passenger and enhance its marketability.

Additionally, since the inner surface 61 of the garnish main body 5 and the interior side end 33a of the third side 37 of the bracket 3 are held in linear contact with each other, the rib 63 projecting from the inner surface 61 of the garnish main body 5 can be made small to prevent any "sink" that can adversely affect the surface quality of the garnish main body from being produced.

Still additionally, since the boss 65 on the inner surface 61 of the garnish main body 5 is inserted into the through bore 45 of the third side 37 of the bracket 3 and supported by it, the garnish main body 5 can be easily arranged in position and aligned with other components.

Still additionally, since the ends 51, 53 of the garnish main body 5 are respectively secured by the anchor members 39, 41 of the bracket 3 and the lip 101 of the welt 10, a secure support is provided without the use of a separate clip and hence the overall cost of the structure can be reduced.

Still additionally, the engagement of the recess 571a of the rib 571 and the anchor member 41 of the bracket 3 is securely maintained even if the internal temperature of the automobile rises high to make the rib 571 apt to be separated from the anchor member 41 of the bracket 3.

Still additionally, since the bracket 3 has anchor members 39, 41 cut and stood up therefrom, this structure has a spring function.

In the transversal cross sectional view of the garnish main body 5, a front side plane 57 is designed to pass a position closest to the interior side end 35a of the second side 35 of the bracket 3 and a rear side plane 59 of the garnish main body 5 is formed substantially straight between the rear end 53 and the projecting section 55 which has a minimum radius of curvature on the straight line 43 connecting the eye point 4 of the front passenger seat and the first side 33 of the bracket 3 so that, when viewed from the eye point 4 of the front passenger seat, the garnish main body 5 has a small transversal cross section. Additionally, since the transversal cross section of the bracket 3 and that of the garnish main body 5 are not reduced at all, they can be made as strong as ever.

While the embodiment was described above in terms of a front pillar 1 (or the 1st pillar), the "pillar" may be a center pillar (or the 2nd pillar) arranged between the front panel disposed vis-a-vis an end 9a of the front side window panel 9 that operates as the above defined "front window panel" and the rear panel disposed vis-a-vis an end of the rear window panel that operates as the above defined "rear window panel". Alternatively, it may be a rear pillar (the 3rd pillar) arranged between the front panel disposed vis-a-vis an end of the rear side window panel that operates as the above defined "front window panel" and the rear panel disposed vis-a-vis an end of the rear window panel that operates as the above defined "rear window panel". Still alternatively, it may be a pillar arranged between a pair of side window panels of a so-called one-box car comprising a plurality of side window panels. If such is the case, it will be understood that the garnish main body may be not only clamped at the rear end 53 by an anchor member of the bracket and the lip of the welt engaged with a flange of the pillar inner panel as the above embodiment but also secured appropriately at the front end.

While the "eye point 4" is described in terms of a person sitting on the "front passenger seat" in the above embodiment, it may be that of the driver sitting on the driver's seat. If the pillar is a center pillar or a rear pillar, it may be that of a passenger sitting on a "rear passenger seat". If the present invention is applied to a so-called one-box car comprising a plurality of side window panels, it may be that of a passenger sitting on a "seat" disposed corresponding to the applicable side window panel. In any case, for the purpose of the invention, the eye point refers to the eye point of JSAE 50 percentile mannequin.

As described above in detail, according to the invention, there is provided a pillar garnish support structure for an automobile comprising an pillar inner panel having a substantially U-shaped cross section and including an front panel disposed vis-a-vis an end of the front window panel of the automobile and a rear panel disposed vis-a-vis an end of the rear window panel of the automobile and a garnish main body supported by the front and rear panels of the pillar inner panel by way of a bracket interposed therebetween in such a way that the internal surface of the pillar inner panel is covered by the garnish main body, characterized in that the bracket is provided with a projection having its tip displaced from the rear panel of the pillar inner panel toward the rear end of the automobile and the projection is provided with a through bore and that said garnish main body has its inner surface held in linear contact with the tip of the projection of said bracket and includes a boss inserted into the through bore of the projection of the bracket and supported by the projection. With such an arrangement, if the bracket is pushed by a person getting into the automobile, the projection is made to directly face the applied pushing force to prevent the bracket from being deformed because the tip of the projection of the bracket is displaced toward the person or the rearward of the automobile from the position of the rear panel of the pillar inner panel. Thus, the structure provides a secure feeling and enhance its marketability.

Additionally, since the inner surface of the garnish main body and the projection of the bracket are held in linear contact with each other, the rib projecting from the inner surface of the garnish main body can be made small to prevent any "sink" that can adversely affect the surface quality of the garnish main body from being produced.

Finally, since the boss on the inner surface of the garnish main body is inserted into the through bore of the projection of the bracket and supported by the projection, the garnish main body can be easily arranged in position and aligned with other components.

According to a preferable mode of carrying out the present invention, at least one of the ends of the garnish main body is clamped between an anchor member of the bracket and a lip of a welt held in engagement with a flange of the pillar inner panel. With such an arrangement, there is an additional effect of providing a secure support without the use of a separate clip and hence reduced cost because at least one of the ends of the garnish main body is clamped between an anchor member of the bracket and a lip of a welt.

According to another preferable mode of carrying out the present invention, a rib having a recess is formed on the inside of the other end of the garnish main body and held in engagement with the anchor member of the bracket. With such an arrangement, there is an additional effect of securely maintaining the engagement of the recess of the rib and the anchor member of the bracket even if the internal temperature of the automobile rises high to make the rib apt to be separated from the anchor member of the bracket.

According to still another preferable mode of carrying out the present invention, the anchor member of the bracket is formed as a raised member standing up from at least either one of the front panel and the rear panel. With such an arrangement, there is an additional spring effect because the bracket is formed by arranging a raised member standing up from at least either one of the front panel and the rear panel.

It should be understood that many modifications and adaptations of the invention will become apparent to those skilled in the art and it is intended to encompass such obvious modifications and changes in the scope of the claims appended hereto.

What is claimed is:

1. A pillar garnish support structure for a vehicle including a pillar inner panel having a substantially U-shaped cross section and having a front panel disposed vis-a-vis an end of a front window panel of the vehicle and a rear panel disposed vis-a-vis an end of a rear window panel of the vehicle and a garnish main body supported by the front panel and the rear panel of the pillar inner panel in such a way that an inner surface of the garnish main body confronts the internal surface of the pillar inner panel so that the pillar inner panel is covered by the garnish main body, the pillar garnish support structure comprising:

a bracket interposed between the garnish main body and the pillar inner panel, said bracket is provided with a projection having its apex displaced rearward from the rear panel of the automobile and said projection is provided with a through bore;

said projection of said bracket linearly contacting the inner surface of the garnish main body and receiving and supporting a boss of the garnish main body inserted into the through bore of said projection of said bracket.

2. The pillar garnish support structure for a vehicle according to claim 1, wherein:

said bracket comprising a first anchor member for clamping at least one garnish main body end with respect to the pillar inner panel.

3. The pillar garnish support structure for a vehicle according to claim 1, wherein:

said bracket comprising a second anchor member for engaging a recess in a rib on the inner surface of at least one garnish main body end.

4. The pillar garnish support structure for a vehicle according to claim 2, wherein:

said bracket comprising a second anchor member for engaging a recess in a rib on the inner surface of a least one garnish main body end.

5. The pillar garnish support structure for a vehicle according to claim 2, wherein:

said first anchor member of said bracket comprises a raised member standing up from at least one of the front panel and the rear panel.

6. The pillar garnish support structure for a vehicle according to claim 3, wherein:

said second anchor member of said bracket comprises a raised member standing up from at least one of the front panel and the rear panel.

7. The pillar garnish support structure for a vehicle according to claim 4, wherein:

said first anchor member and said second anchor member of said bracket each comprise a raised member standing up from the front panel and the rear panel respectively.

* * * * *